US012554397B2

(12) United States Patent
Sanders et al.

(10) Patent No.: US 12,554,397 B2
(45) Date of Patent: Feb. 17, 2026

(54) DATA VALIDATION CHECKPOINT AND FLASH MEMORY ROLLBACK

(71) Applicant: International Business Machines Corporation, Armonk, NY (US)

(72) Inventors: Lee Jason Sanders, Chichester (GB); Roderick Guy Charles Moore, Bournemouth (GB); Florent Christian Rostagni, Eastleigh (GB); Paul Nicholas Cashman, Burnham-on-Sea (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/745,293

(22) Filed: Jun. 17, 2024

(65) Prior Publication Data
US 2025/0348212 A1 Nov. 13, 2025

(30) Foreign Application Priority Data
May 10, 2024 (GB) ..................................... 2406583

(51) Int. Cl.
*G06F 3/06* (2006.01)
(52) U.S. Cl.
CPC .......... *G06F 3/0604* (2013.01); *G06F 3/0655* (2013.01); *G06F 3/0676* (2013.01); *G06F 3/0679* (2013.01)
(58) Field of Classification Search
CPC ........ G06F 1/30; G06F 1/305; G06F 11/2015; G06F 12/0246; G06F 2212/1032;
(Continued)

(56) References Cited

U.S. PATENT DOCUMENTS

| 10,409,986 B1 | 9/2019 | Natanzon |
| 11,663,336 B1 | 5/2023 | Armangau |

(Continued)

OTHER PUBLICATIONS

Intellectual Property Office, Patents Act 1977: Examination Report under Section 17(5), Dec. 18, 2024, 3 Pages, GB Application No. 2406583.1.

(Continued)

*Primary Examiner* — Jane W Benner
(74) *Attorney, Agent, or Firm* — Kristofer Haggerty

(57) ABSTRACT

A method, system, computer program product, and computer program for managing data in a storage system, the storage system comprising: a set of subsystems comprising: a structure comprising a set of mappings between logical and mapped addresses; and a storage device comprising a first data version at a first mapped address; the method comprising: for at least one substructure: providing, in the structure, for the first logical address, a verified pointer to the first mapped address; writing a second data version for a second mapped address, the second mapped address different from the first mapped address; providing, in the structure, for the first logical address a write-head pointer to the second mapped address; gathering the second data version to determine metadata for the second data version, the metadata associated with an indicator; in response to the indicator comprising a verify indicator; updating the verify pointer to the second mapped address.

24 Claims, 12 Drawing Sheets

(58) Field of Classification Search
CPC ...... G06F 3/0617; G06F 3/0619; G06F 3/064; G06F 3/0679; G06F 3/0688
See application file for complete search history.

(56) References Cited

U.S. PATENT DOCUMENTS

| | | | |
|---|---|---|---|
| 2011/0078407 A1* | 3/2011 | Lewis | G06F 16/1815 |
| | | | 711/213 |
| 2016/0147468 A1 | 5/2016 | Desai et al. | |
| 2020/0097653 A1 | 3/2020 | Mehta | |
| 2020/0250305 A1 | 8/2020 | Pendyala | |
| 2020/0342106 A1 | 10/2020 | Chelarescu | |
| 2021/0011845 A1 | 1/2021 | Huang | |
| 2023/0252165 A1 | 8/2023 | De'Souza | |
| 2023/0325504 A1 | 10/2023 | Armangau | |

OTHER PUBLICATIONS

International Searching Authority, "Notification of Transmittal of the International Search Report and the Written Opinion of the International Searching Authority, or Declaration," Patent Cooperation Treaty, Jul. 10, 2025, 14 pages, International Application No. PCT/EP2025/061239.

* cited by examiner

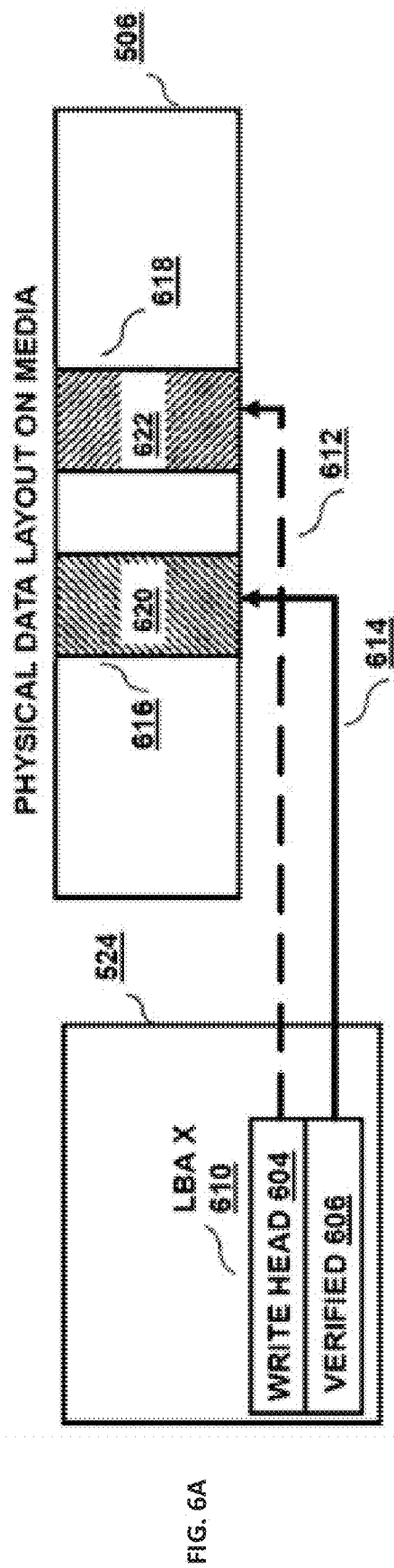
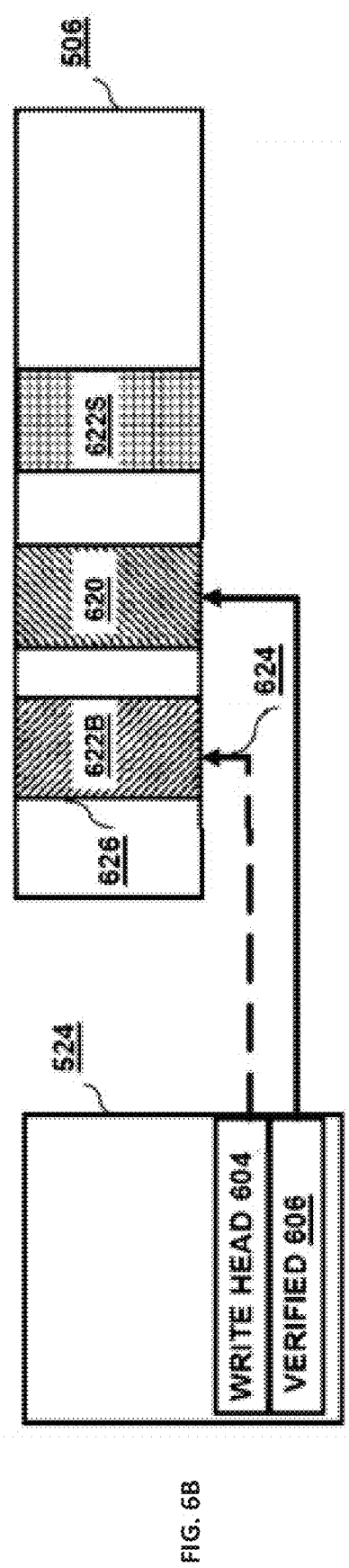
FIG. 6A
FIG. 6B

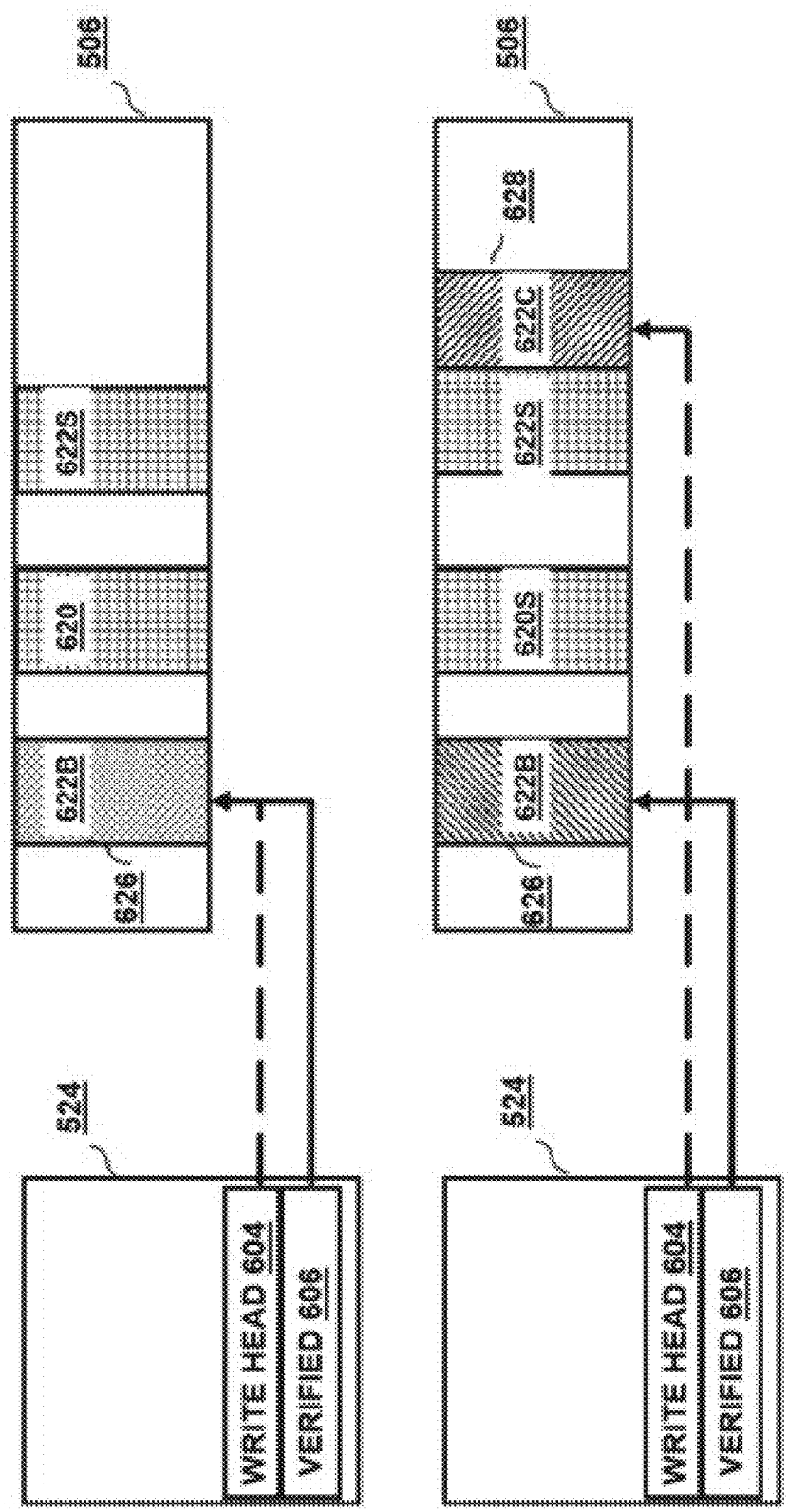

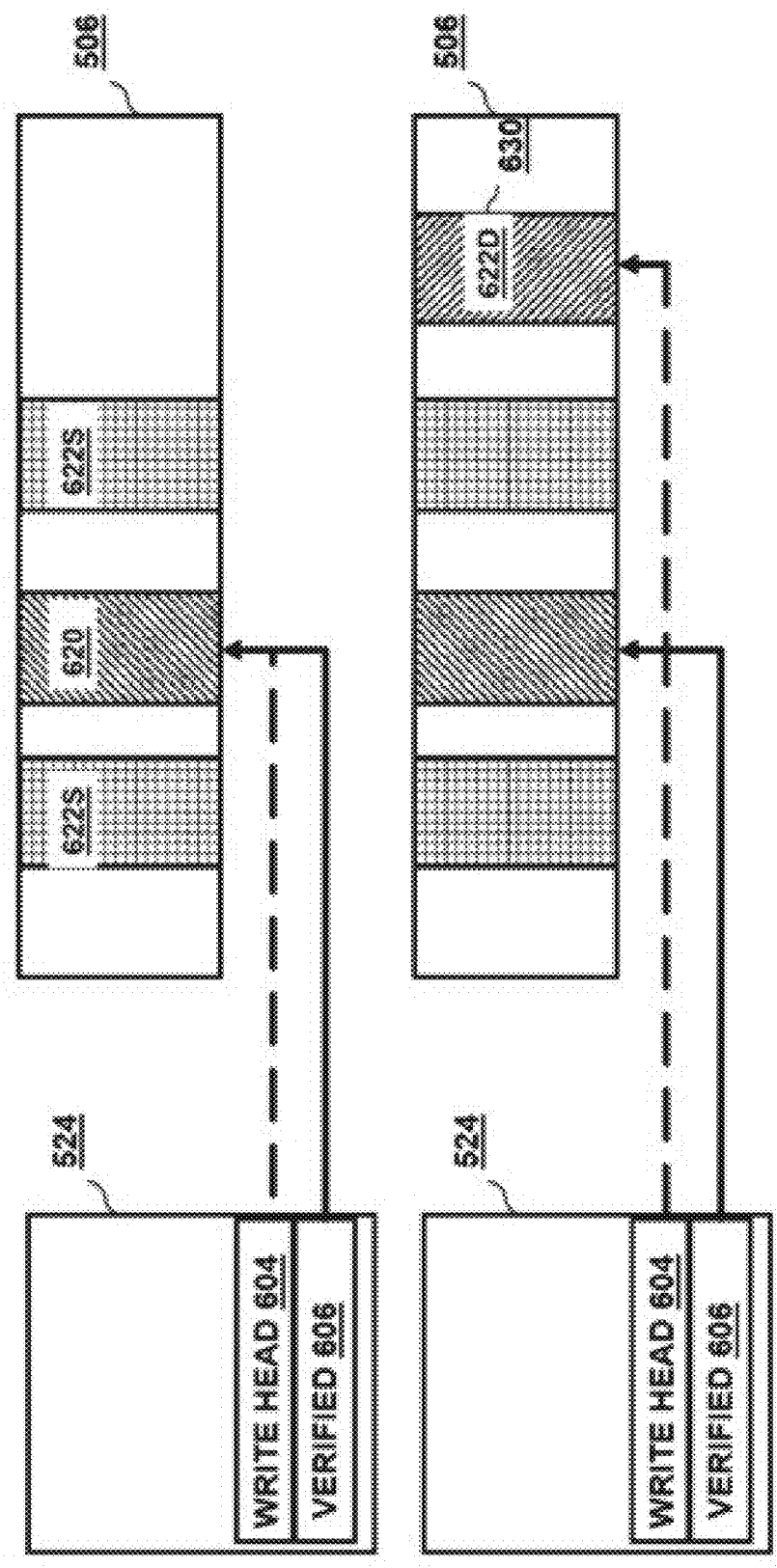

DATA VALIDATION CHECKPOINT AND FLASH MEMORY ROLLBACK

TECHNICAL FIELD

The invention is generally directed to storage. In particular it provides a method, system, and computer program product suitable for managing data in a storage system.

BACKGROUND ART

Flash memory is non-volatile computer storage. Examples are solid-state drives (SSDs), and memory cards such as SD cards. Flash memory is known for its fast read and write speeds, high reliability, and low power consumption. An example of flash memory are IBM FlashCore® Modules (FCM), which provides computational abilities comprising a microprocessor, an FPGA, NAND flash and DRAM and MRAM for caching. FCM provides condensed high capacity flash memory within a small form factor that also provides real time data reduction techniques such as compression/decompression as the data is written and read from the drive.

Ransomware attacks are becoming a common method by attackers to exploit system users to extract money from companies that store large amounts of data. Often a significant amount of data has already been encrypted by the attackers before users and system administrators discover the attack.

Ransomware detection software is available that analyses files in a similar way that virus scanners operate checking for a signature of ransomware such as file encryption, file changes over times, and compression statistics etc. IBM® Storage Sentinel is workload-specific software that detects, diagnoses and identifies the sources of ransomware attacks and provides automated recovery orchestration.

Real time statistics of the data stored by IBM FlashSystem® is also collected and analysed by IBM Storage Insights and IBM Spectrum® Control, including statistics such as read/write rates, compression rate and Shannon Entropy of data.

IBM, IBM Flashcore, IBM FlashSystem, IBM Spectrum are trademarks of International Business Machines Corporation, registered in many jurisdictions worldwide.

Shannon Entropy is a measure of uncertainty and information content in probability distributions. For ransomware detection the Shannon entropy is useful as a measure of randomness and can help distinguish between strong encryption, weak encryption, and no encryption. A host compromised by encrypting ransomware is expected to write encrypted data with high entropy compared to a host running a regular application.

The Shannon Entropy is computed by the CPU as it arrives into the write cache of the IBM FlashSystem before the write data is submitted to the drive. If any anomaly is detected by IBM Storage Insights, the controller is informed. Typically only a small percentage is examined as computation is expensive.

Shannon Entropy is just one technique where the data can be validated. There are other techniques available for data validity, such as Renyi Entropy, and Kullback-Leibler Divergence.

Therefore, there is a need in the art to address the aforementioned problem.

SUMMARY OF INVENTION

According to the present invention there are provided a method, a system, and a computer program product according to the independent claims.

Viewed from a first aspect, the present invention provides a computer implemented method for managing a storage system, the storage system comprising a set of subsystems, each subsystem comprising: a structure comprising a set of mappings between logical addresses and mapped addresses; and a storage device comprising a first data version for the first logical address at a first mapped address; the method comprising: for at least one substructure: providing, in the structure, for the first logical address, a verified pointer to the first mapped address; writing a second data version for the first logical address at a second mapped address, the second mapped address different from the first mapped address; providing, in the structure, for the first logical address a write-head pointer to the second mapped address; gathering the second data version to determine metadata for the second data version, the metadata associated with an indicator; in response to the indicator comprising a verify indicator, updating the verify pointer to the second mapped address.

Viewed from a further aspect, the present invention provides a system for managing a storage system, the storage system comprising a set of subsystems, each subsystem comprising: a structure comprising a set of mappings between logical addresses and mapped addresses; and a storage device comprising a first data version for the first logical address at a first mapped address; the system comprising: for at least one substructure: a pointer component for providing, in the structure, for the first logical address, a verified pointer to the first mapped address; a read/write component for writing a second data version for the first logical address at a second mapped address, the second mapped address different from the first mapped address; the pointer component for providing, in the structure, for the first logical address a write-head pointer to the second mapped address; a gather component for gathering the second data version to determine metadata for the second data version, the metadata associated with an indicator; responsive to the indicator comprising a verify indicator; the pointer component for updating the verify pointer to the second mapped address.

Preferably, the present invention provides a method, system, computer program product and computer program, further comprising: in response to the indicator comprising a non-verify indicator, reading the first data version and the second data version.

Preferably, the present invention provides a method, system, computer program product and computer program, further comprising: in response to the indicator comprising a non-verify indicator, updating the write-head pointer to the first mapped address.

Preferably, the present invention provides a method, system, computer program product and computer program, further comprising: wherein the storage device comprises a set of further data versions at respective further addresses, the method further comprising, in response to the indicator comprising a verify indicator, adding the first data version at the first mapped address to the set of further data versions.

Preferably, the present invention provides a method, system, computer program product and computer program, further comprising: in response to the indicator comprising a non-verify indicator, adding the second data version at the second mapped address to the set of further data versions.

Preferably, the present invention provides a method, system, computer program product and computer program, further comprising: garbage collecting the set of further data versions by deleting the set of further data versions.

Preferably, the present invention provides a method, system, computer program product and computer program, wherein the mapped address comprises a physical address of the storage device.

Preferably, the present invention provides a method, system, computer program product and computer program, wherein the storage device is one of a list, the list comprising: a storage controller; Flash memory; a disk drive; and other writable storage devices that allow for logical to physical mappings.

Preferably, the present invention provides a method, system, computer program product and computer program, Preferably, the present invention provides a method, system, computer program product and computer program, further comprising: wherein the structure is a log structured array.

Preferably, the present invention provides a method, system, computer program product and computer program, wherein the storage device is operable for storing data sequentially.

Preferably, the present invention provides a method, system, computer program product and computer program, further comprising: identifying a set of first logical addresses identified with a storage volume; for each subsystem associated with the storage volume, analysing the second data version to determine a collated metadata set; analysing the collated metadata set to determine the indicator for the storage volume; and providing the indicator to each of the subsystems associated with the storage volume.

Preferably, the present invention provides a method, system, computer program product and computer program, wherein analysing the collated metadata set comprises performing a Shannon entropy analysis.

Preferably, the present invention provides a method, system, computer program product and computer program, wherein in response to the indicator comprising a non-verify indicator, for each subsystem associated with the storage volume reading the first data version and the second data version; collating each of the first data versions into a first volume version; collating each of the second data versions to a second volume version; comparing the first volume version with the second volume version to select a chosen volume version.

Preferably, the present invention provides a method, system, computer program product and computer program, wherein in response to the chosen volume version being the first volume version, for each of the storage devices associated with the storage volume, updating the write-head pointer to the first mapped address.

Preferably, the present invention provides a method, system, computer program product and computer program, wherein in response to the chosen volume version being the second volume version, for each of the storage devices associated with the storage volume, updating the verify pointer to the second mapped address.

Viewed from a further aspect, the present invention provides a computer program product for managing a storage system, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Advantageously, the present invention provides a rollback ability within Flash memory to keep new inbound writes in a buffer that can have validation (such as entropy checking) performed before the new data is committed to the Flash memory and prior to making the old data garbage collectable.

Advantageously, processing is carried out as close to the Flash memory as possible. System cache is expensive and the higher it is located in the stack, the more expensive it is. For example, if data is to be compressed it is more cost effective to store data in a cache after compression, so that more data can be stored. A storage controller has a certain amount of cache, regardless of the number of drives it contains, so the more drives there are, the smaller the portion of the controller cache for each drive will be. On the other hand, a drive also has its own cache and is the master of it: it decides when to write that to permanent storage, and more particularly in our case for example after having performed entropy checks or a ransomware detect analysis.

Data transfer between drives and caches on controllers is undesirable. In particular, drives should not drive cache de-stage on the controller, mainly because the size of the cache on the controller is of finite size and the drives may not easily know the size of that cache.

Advantageously, preferred embodiments of the present invention have a benefit over deferred de-stage of a second copy managed by a host controller, because data does not need to be held in cache for prolonged period when the entropy is checked/validated.

Advantageously, computational storage performs complex data operations as close to the data as possible to avoid excessive reads and writes. If a host were to analyse whether a storage volume is under a ransomware attack, a read command needs to be issued to the entire volume, followed by opening files or statistical entropy checks. Alternatively, a storage controller can perform this ransomware detection itself, by reading the entire volume, whose data is spread across many drives, followed by data analysis. This way avoids having to pass data to the host, thereby saving bandwidth, and host CPU cycles etc.

However, taking a further step, embodiments of the present invention can be carried out using drive computation if the drives have the knowledge of which volumes is sending them which data to write. Indeed, if a drive can remember all the writes it did for a particular volume, then it can perform the ransomware detection analysis on the data it owns for this volume, thus saving the storage controller from doing that work (saving CPU, etc.), that work will be highly parallelized, as it can be performed on all drives, and bandwidth between the controller and the drives will be saved.

BRIEF DESCRIPTION OF THE DRAWINGS

The present invention will now be described, by way of example only, with reference to preferred embodiments, as illustrated in the following figures:

FIGS. 6A-6F depict exemplary physical data layout on Flash memory and related elements of a related forward lookup structure 524, 526 according to a preferred embodiment of the present invention;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
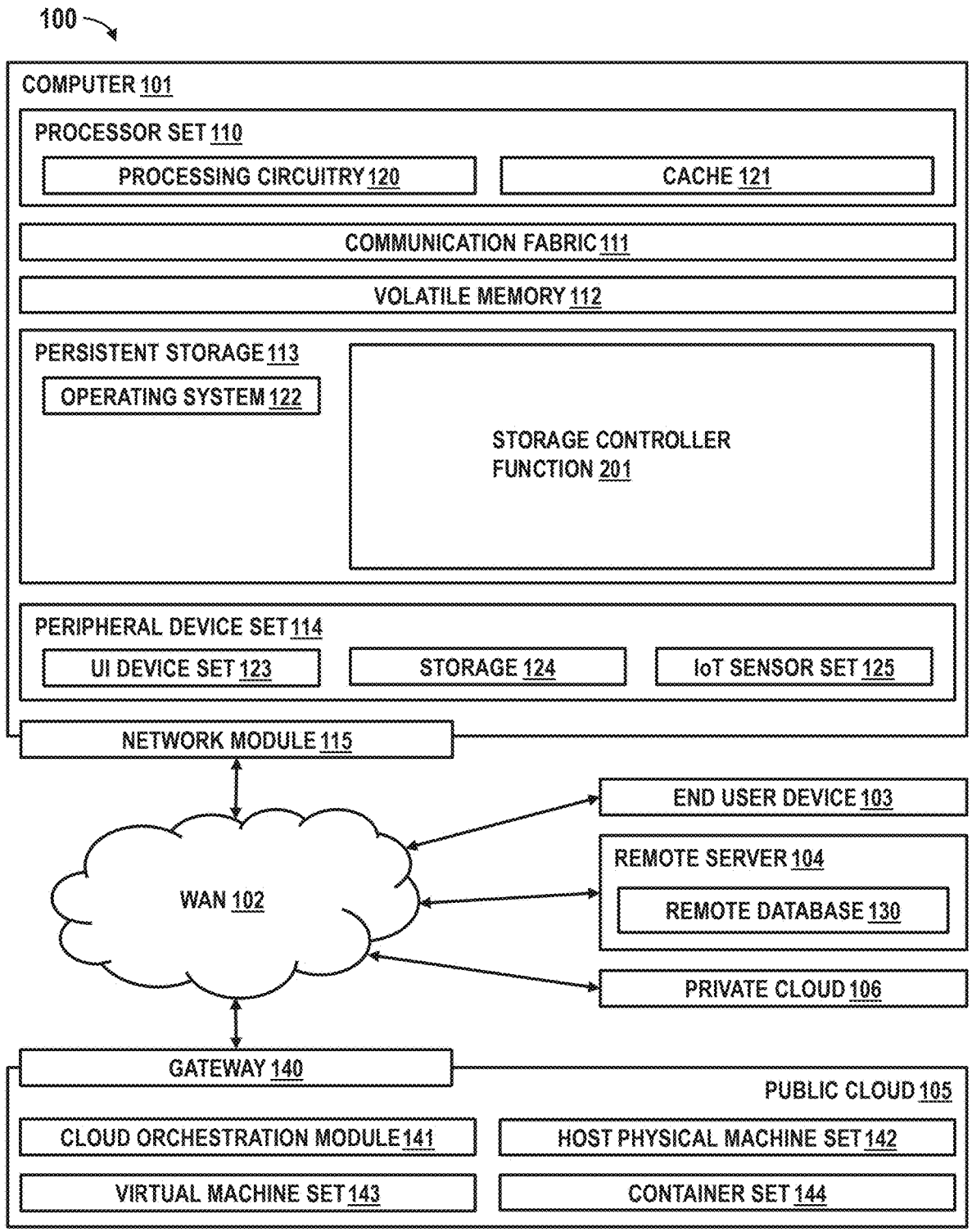
FIG. 1 depicts a computing environment 100, according to an embodiment of the present invention.

FIG. 1 depicts a computing environment 100. Computing environment 100 contains an example of an environment for the execution of at least some of the computer code involved in performing the inventive methods, such as software functionality 201 for an improved storage controller 412 and storage device 14. In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 201 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Structures are used to store metadata that describes where user data is to be found. Such structures are often stored on storage devices, but some are held within memory. In order to track updates, journals can be held to record updates to metadata structures, and to ensure that they remain consistent. An example of a structure is a forward lookup b-tree, but other architectures are possible. Forward lookup structures allow efficient lookup based on a unique identifier. In contrast reverse lookup structures allow for efficient lookup to find data based on some related information. A backward lookup structure provides a mapping between logical addresses and corresponding physical addresses used within flash memory. When a read or write command is issued to the flash using a logical address, the backward lookup structure provides the corresponding physical address.

In practice a forward lookup structure is typically an efficient log structured array (LSA). An LSA is efficient to search within using address search terms, but is not so efficient when using hash value search terms. Therefore, a hash lookup uses a large amount of memory.

Log Structured Array (LSA) is a technique for storing random access data in a sequential fashion on a random access storage device. The technique is used for storage systems that implement thin provisioned volumes. Metadata is stored in the data storage system by way of an LSA tree structure operable by fixed mapping, the tree structure comprising respective leaves wherein some leaves are configurable to respectively comprise a predefined range of respective slots with each slot representing a given virtual address in respect of which data is written onto the data storage system in a given host write, the population of a given slot depending on whether a given host write is performed in respect of the virtual address represented by that given slot, and some leaves are allocated to comprise given nodes that are each configurable to point towards a given leaf when accessed.

Full hash values of stored data are saved in the forward lookup structure on persistent storage e.g. for example in a separate volume of the storage system. This forward lookup structure allows access by the virtual address in log(n) time, and is organised to optimise the required number of device accesses, typically with multiple caching. Lookup provides details of the data, such as reference counts, physical address of the data on storage device, a hash value of the data, and any other useful bits of metadata. In addition to these structures, a reverse lookup structure is typical. This provides information about which storage device owns a given chunk of on-device metadata. Typically this is used for operations such as garbage collection.

If a leaf-node in a b-tree is read in a LSA, there are typically multiple hashes next to each other. >200 duplicates are not unusual.

With LSA systems, there is a per volume directory look up that maps the virtual address of the data to the physical location. As user data is overwritten, user data is written elsewhere. This requires a garbage collector to gather valid data and relocate it, so that free areas of the physical space can be coalesced.

Drives have a fixed capacity, so storage controllers cannot create different sized volumes in a drive. As a result, in a Flash memory, there is one LSA comprising one directory. In contrast in a storage controller, where multiple virtual volumes can be created, an implementation of an LSA could have one directory per virtual volume. Alternatively, an LSA could be implemented with one directory for all virtual volumes.

An LSA is used to manage and optimize the performance of flash memory-based storage arrays. In traditional storage systems, updates to existing data require rewriting entire blocks. Using an LSA architecture, data is written sequentially to log segments in the flash memory, thereby minimizing erase-before-write operations. However, as data is written and deleted in the flash memory, unused or stale data accumulates in log segments. Therefore there is a need for "garbage collection" algorithms to periodically reclaim space by consolidating valid data from multiple segments into new segments and erasing old segments. An LSA within the storage system keeps track of where logical storage units are physically stored on the Flash memory device itself.

An LSA is used as a directory that defines the physical placement of data blocks independent of size and logical location. Each logical block device has a range of Logical Block Addresses (LBAs), starting from 0 and ending with the block address that fills the capacity. When written, an LSA enables data to be allocated sequentially, providing a lookup to match the LBA with the physical address within a storage device array.

Thin provisioning is a technique to represent volumes on a storage system to be much larger than the amount of physical data that has been written. The user benefits because the storage system only stores the amount of data that has been written, leaving free capacity to use for other purposes.

Thin provisioning is a concept where storage does not wholly allocate the advertised capacity. Storage is only allocated when it must be used. Both block and file systems have equivalents of this: file systems are effectively thin provisioned by their nature (files can only be allocated upon creation), and block storage systems can have thin provisioning implemented using a forward lookup structure to map allocated ranges to the physical storage medium. Storage can either be kept local to a volume, or pooled between multiple volumes. Thin provisioning allows the implementation of advanced space saving techniques, such as compression and deduplication as one need only update the forward lookup structure with the appropriate details, for example if the forward lookup structure is compressed, or pointing the forward lookup structure for a virtual address to another forward lookup structure entry containing the data in question. A thin-provisioned storage volume presents a different capacity to mapped hosts than the capacity that the storage volume consumes in a storage pool.

A logical unit number (LUN) is a unique identifier for identifying a collection of physical or logical storage. A LUN can reference a single disk, a partition of disks, or an entire RAID array. Logical block addressing (LBA) is a method for specifying a location of blocks of data on storage devices.

Small Computer System Interface (SCSI) a set of command set standards for physically connecting and transferring data between computers and peripheral devices, such as disks. SCSI is available in a number of interfaces, for example, SSA, 1 Gbit Fibre Channel (1GFC), SAS. SCSI can be parallel or serial. The skilled person would understand that there are other command sets and interfaces. Another example is NVM Express (NVMe) or Non-Volatile Memory Host Controller Interface Specification (NVMH-CIS), which is an interface specification for accessing a computer's non-volatile storage media usually attached via PCI Express (PCIe) bus.

In the storage subsystems of IBM® DS8000® series, IBM Storwize®, and IBM FlashSystem, the NVMe protocol is used for communication to the internal disks. In other versions the SAS protocol has been used for communication to internal disks. The storage subsystems have controllers that provide the required hardware adapters for host connectivity to the subsystem. RAID adapters are used to create a virtual disk or logical unit number (LUN) that is configured in one of the supported RAID levels with multiple SAS hard disks based on the level of RAID used. Various levels of RAID of available to configure internal SAS HDDs or SDDs. IBM, DS8000, Storwize, FlashCopy, and Spectrum Virtualize are trademarks of International Business Machines Corporation, registered in many jurisdictions worldwide.

Embodiments will be described in terms of block storage technology, but are equally applicable to other technologies such as file storage technology.

Figure 2:
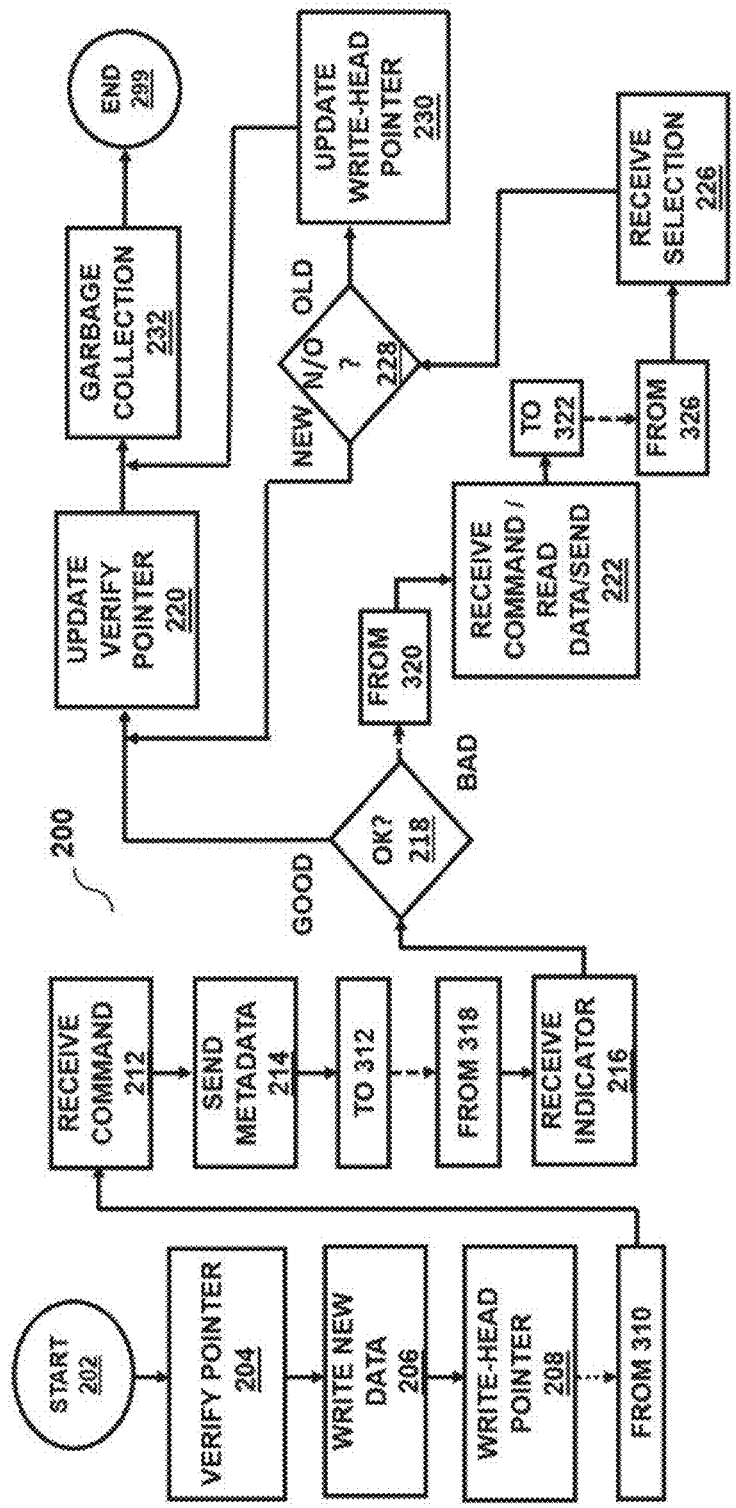
FIG. 2 depicts a high-level exemplary schematic flow diagram 200 depicting operation methods steps for data validation in a storage subsystem, according to a preferred embodiment of the present invention.

FIG. 2, which should be read in conjunction with FIGS. 3 to 8, depicts a high-level exemplary schematic flow diagram 200 depicting operation methods steps for data validation in a storage subsystem, according to a preferred embodiment of the present invention.

Figure 3:
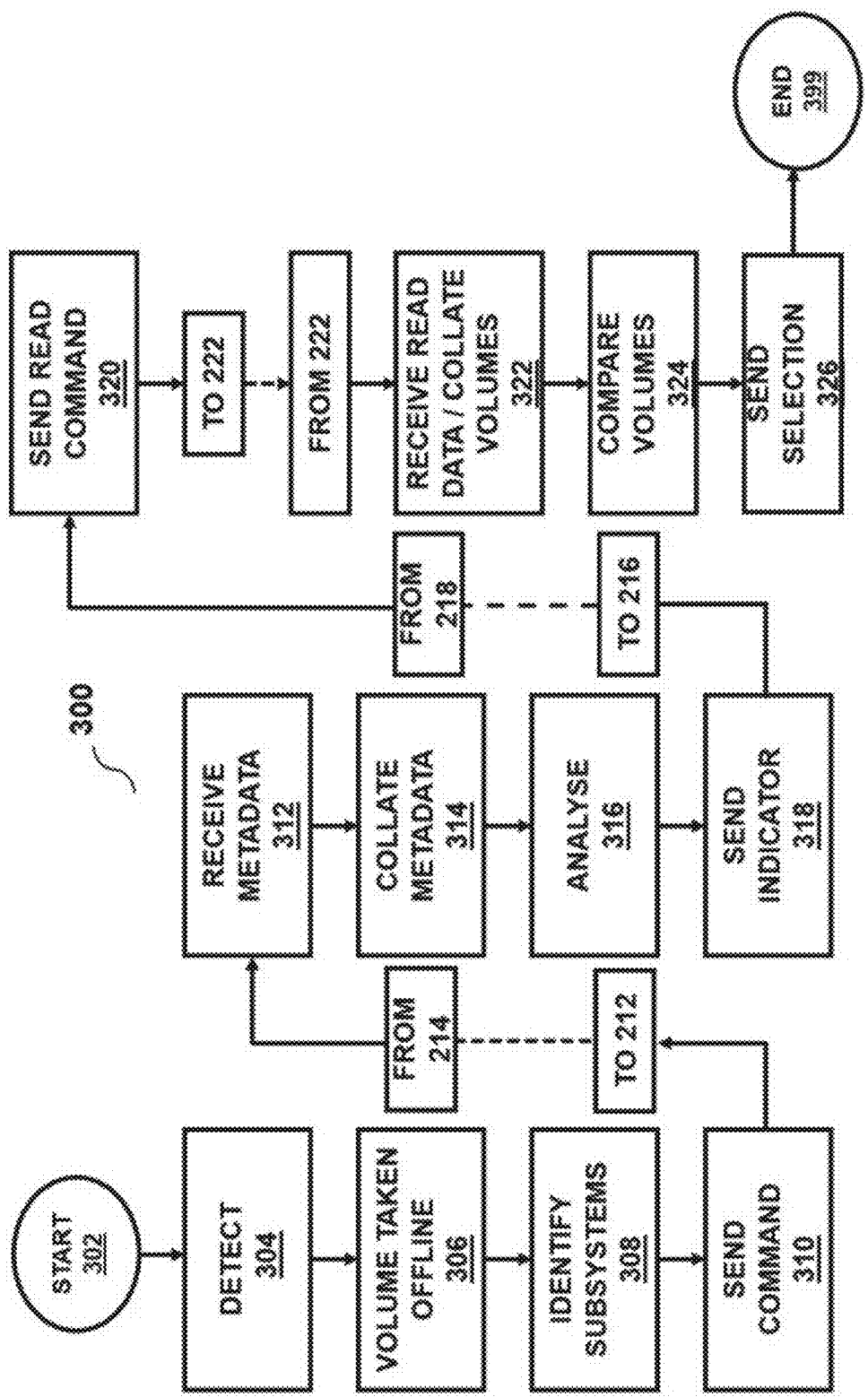
FIG. 3 depicts an exemplary schematic flow diagram 300 depicting control operation methods steps for data validation, according to a preferred embodiment of the present invention.

FIG. 3 depicts an exemplary schematic flow diagram 300 depicting control operation methods steps for data validation, according to a preferred embodiment of the present invention.

Figure 4:
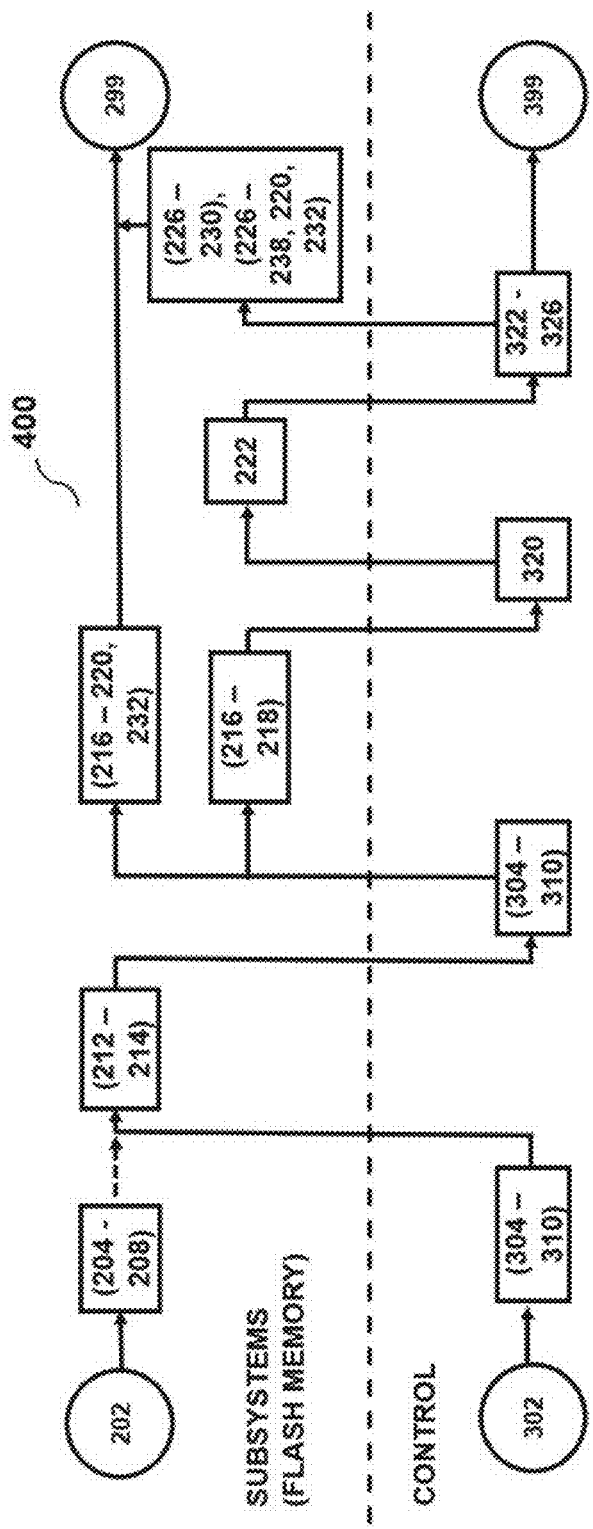
FIG. 4 depicts an exemplary schematic flow diagram 400 depicting interactions between subsystem and control methods steps, according to a preferred embodiment of the present invention.

FIG. 4 depicts an exemplary schematic flow diagram 400 depicting interactions between subsystem and control methods steps, according to a preferred embodiment of the present invention. FIG. 4 depicts interactions between one subsystem 518, 520 and the controller function, but in practice the controller function interacts with a set of subsystems 518, 520. The term "control" to refer to a coordinating function of the storage system 500. The skilled person would understand that the control function can be implemented in a number of system layers, for example, at the host 505 level, the storage controller 512 level, or the storage enclosure 516 level.

Figure 5:
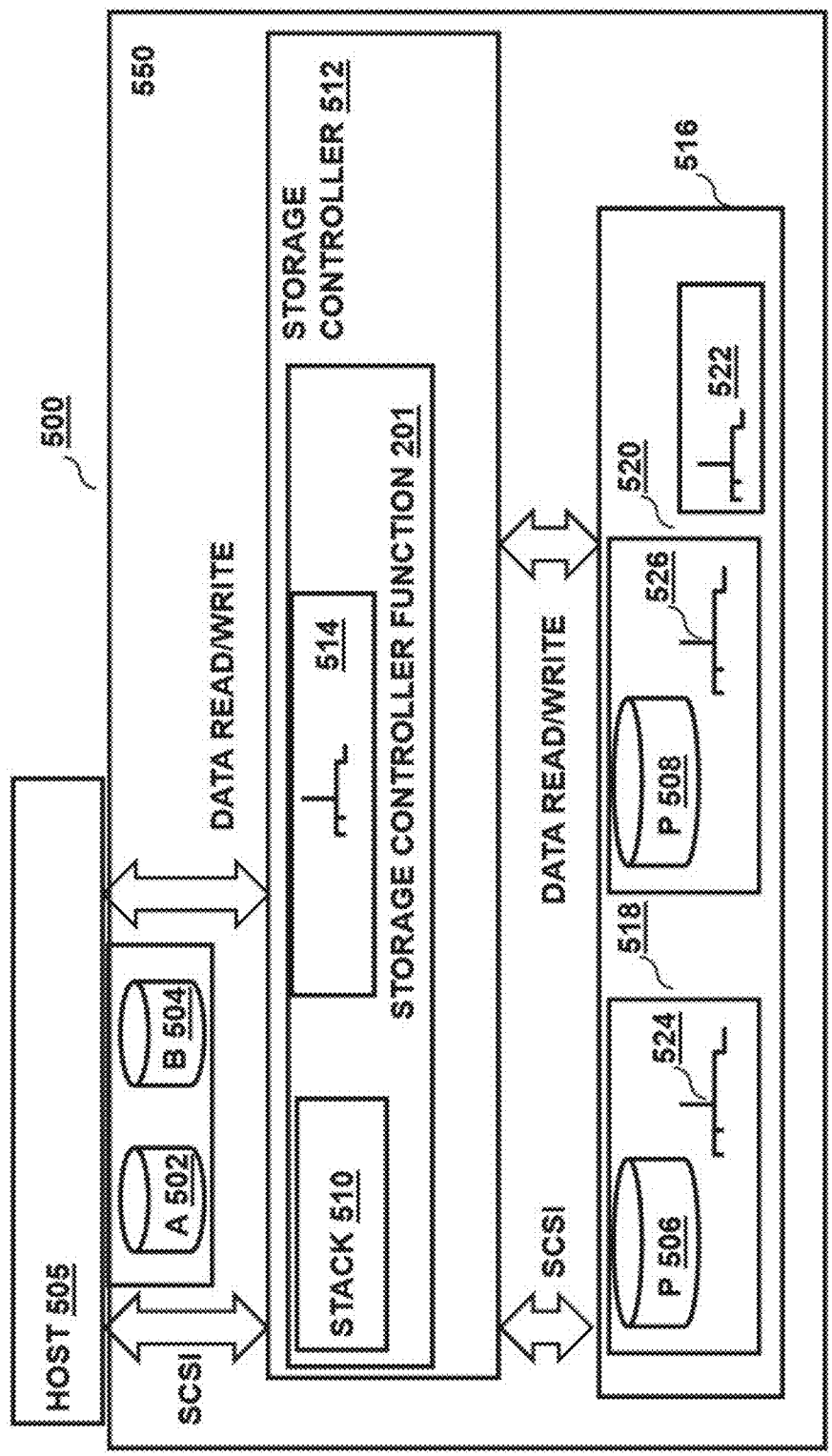
FIG. 5 depicts a high-level exemplary schematic diagram depicting a primary computer system 500, according to a preferred embodiment of the present invention.

FIG. 5 depicts a high-level exemplary schematic diagram depicting a primary computer system 500, according to a preferred embodiment of the present invention. FIG. 5 depicts a host 505, and a storage system 550. The storage system 550 comprises a storage controller 512, and a storage drive enclosure 516. The storage controller 512 also comprises a stack 510 of components, for example a copy services component (not depicted), a cache component (not depicted), and alternatively a fingerprint lookup structure 514. The enclosure 516 comprises two storage subsystems 518, 520, and a forward lookup structure 522. Each subsystem 518, 520 comprises Flash memory 506, 508, and alternatively a forward lookup structure 524, 526. The host 505 may also comprise a forward lookup structure (not depicted). Commands are passed between the host 505, storage controller 512 and drive enclosure 516 using SCSI commands. If a cache is available, data is written to the cache and destaged to the devices according to a cache algorithm. For reads, data is first read from the cache, and only if not present (known as a cache miss), the data is read from the devices. Data is read and written across the depicted interfaces. For the purposes of illustration of the present invention, reads and writes to storage devices 506, 508 are considered a being equivalent to reads and writes to the corresponding cache layers as well. Underlying storage devices are presented to the host 505 as logical storage volumes A 502, and B 504 in a storage pool, because, for example, the actual underlying storage devices in the storage enclosure 516 may be in reality devices of a RAID array.

Arrows depicted in the figures represent SCSI command and also read/write data paths.

FIGS. 6A-6F depict exemplary physical data layout on media 506, 508 and related elements of a related forward lookup structure 524, 526 according to a preferred embodiment of the present invention. The forward lookup structure 524, 526 comprises a set of mappings between logical addresses and mapped addresses. FIG. 6A depicts a write head pointer 604, and a verified pointer 606 for a logical block address (LBA) X 610. FIG. 6A also depicts mapping 614 from verified pointer 606 to a first mapped address 616. FIG. 6A also depicts mapping 612 from write head pointer 604 to a second mapped address 618. FIG. 6A depicts FCM 506 containing a first data version 620 at the first mapped address 616, and a second data version 622 at the second mapped address 618.

Figure 7A:
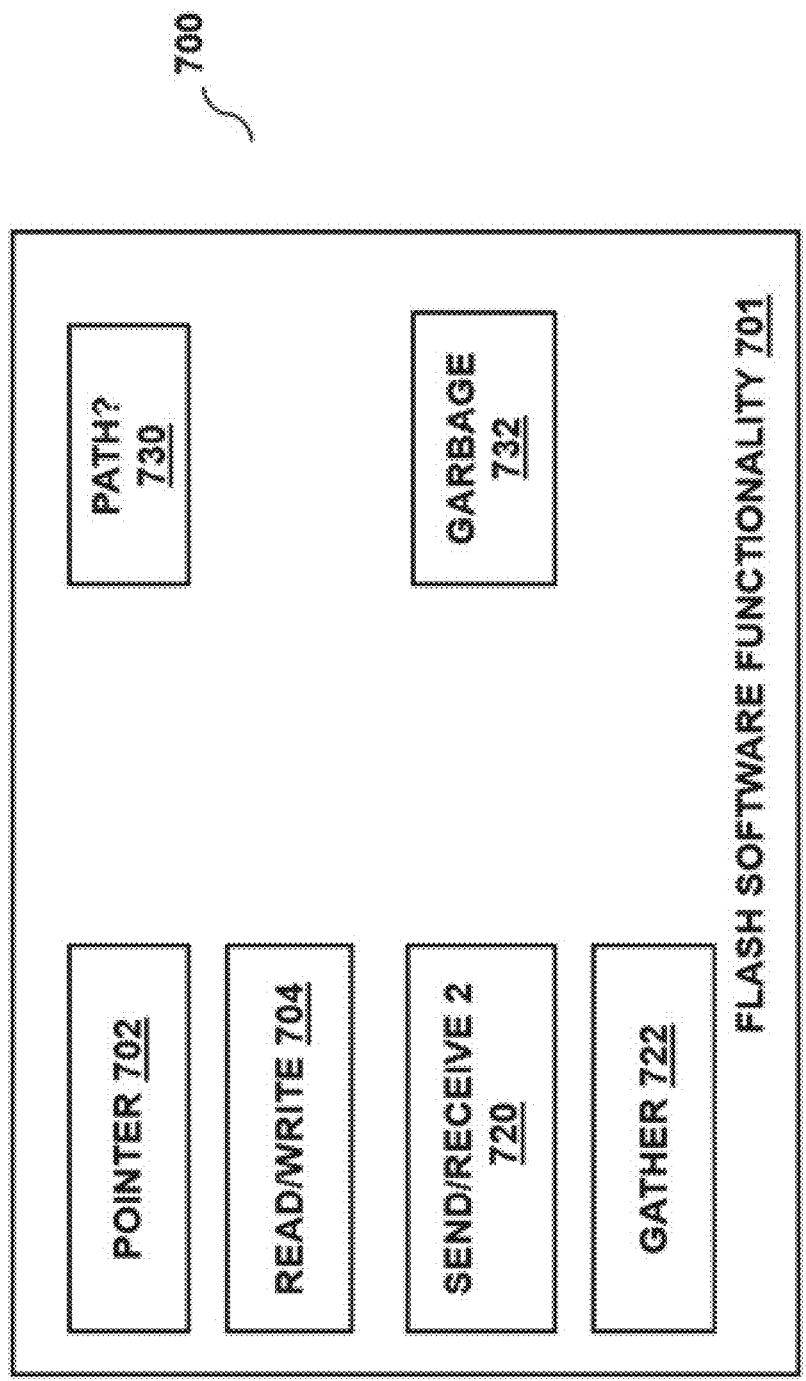
FIG. 7A depicts an exemplary schematic diagram 700 of software elements of the Flash memory software functionality 701, according to a preferred embodiment of the present invention.

FIG. 7A depicts an exemplary schematic diagram 700 of software elements of the FCM software functionality 701, according to a preferred embodiment of the present invention.

Figure 7B:
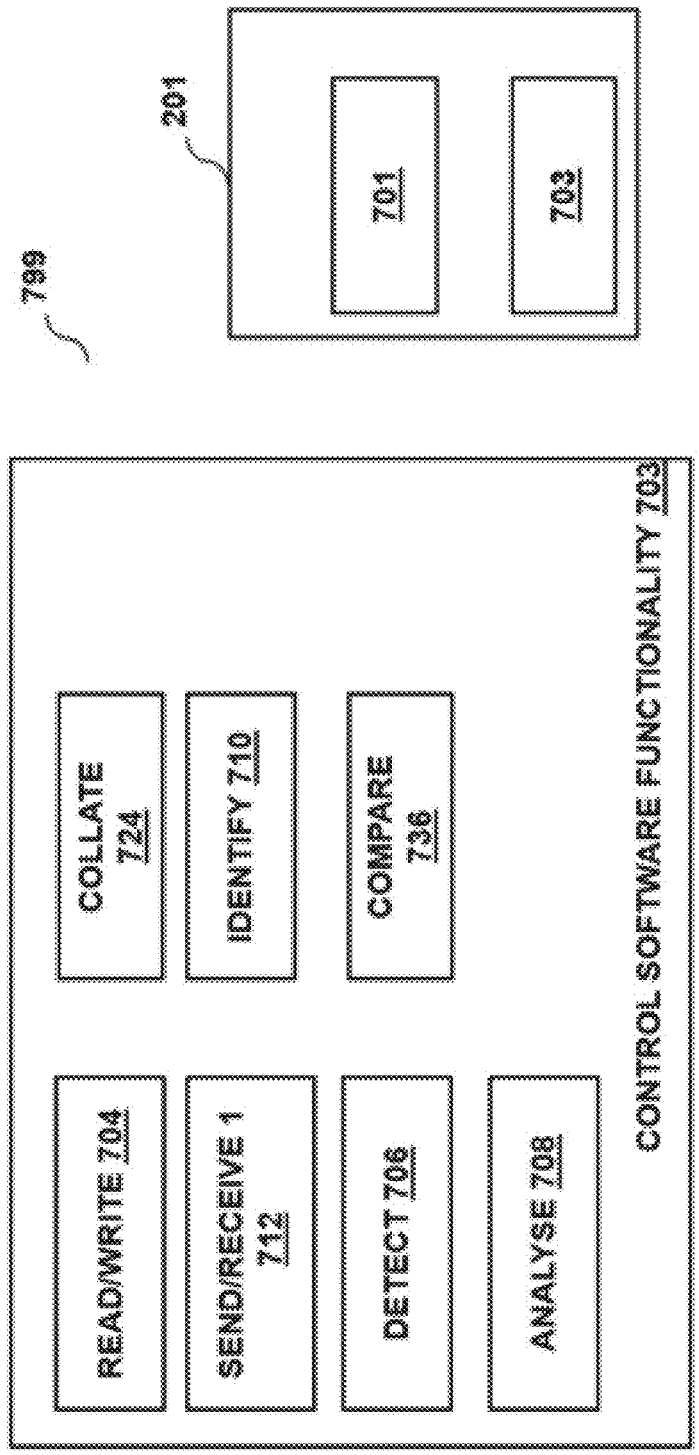
FIG. 7B also depicts an exemplary schematic diagram 799 of software elements of the control software functionality 703, according to a preferred embodiment of the present invention.

FIG. 7B also depicts an exemplary schematic diagram 799 of software elements of the control software functionality 703, according to a preferred embodiment of the present invention. Some of the software elements have components in both the Flash memory and the control function, for example the read/write component 704. Software functionality 201 comprises Flash memory software functionality 701 and the control software functionality 703.

Figure 8:
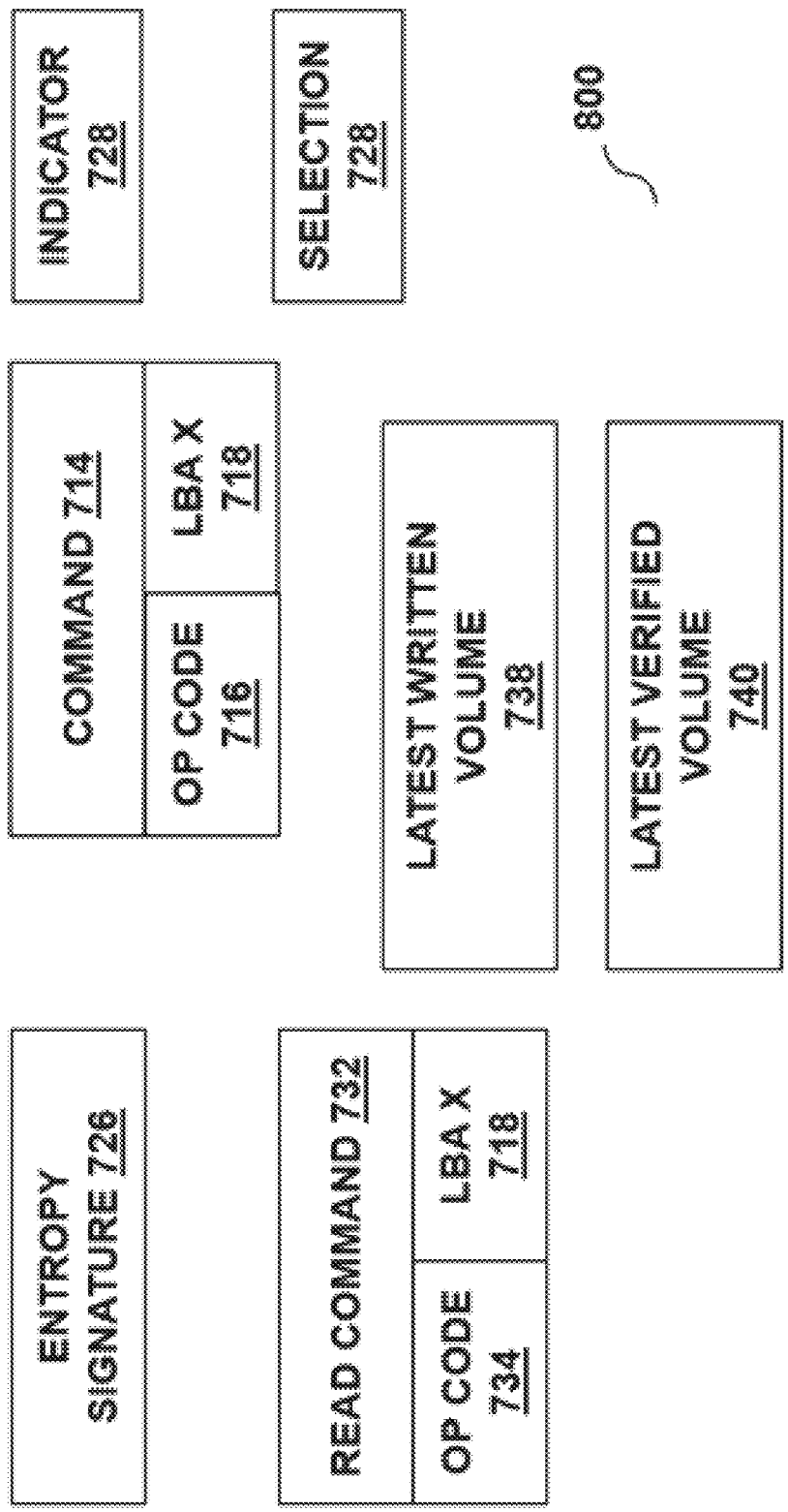
FIG. 8 depicts an exemplary schematic diagram 800 of software structures, according to a preferred embodiment of the present invention.

FIG. 8 depicts an exemplary schematic diagram 800 of software structures, according to a preferred embodiment of the present invention.

Figure 9:
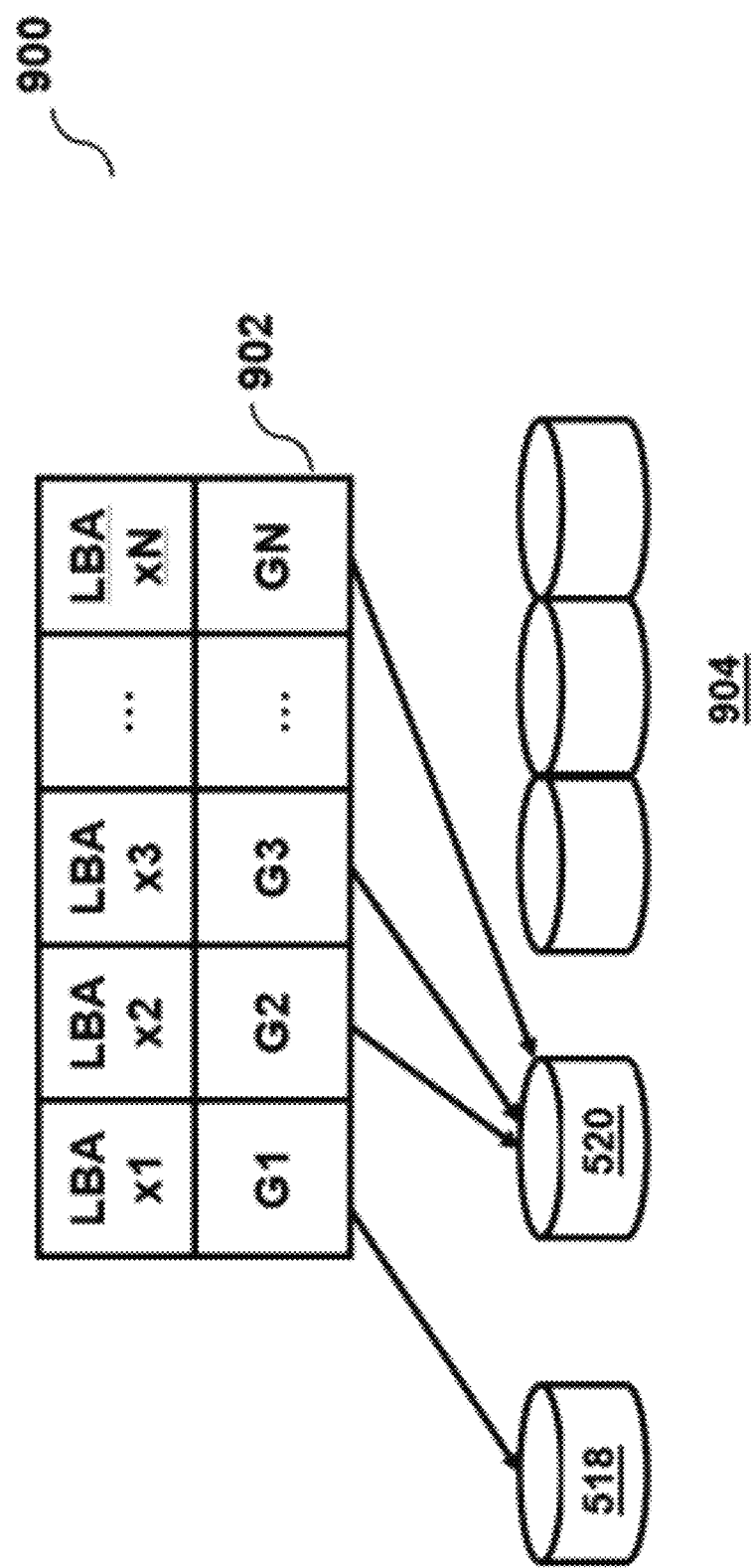
FIG. 9 depicts an exemplary schematic diagram 900 with an exemplary volume 902, according to a preferred embodiment of the present invention.

FIG. 9 depicts an exemplary schematic diagram 900 with an exemplary volume 902, according to a preferred embodiment of the present invention. The exemplary volume 902 comprising grains G1:GN, at respective LBAs x1:xN.

A forward lookup structure 524, 526 is typically an efficient-access lookup structure. The forward lookup structure 524, 526 is typically a log structured array (LSA), searches of which are efficient if based on address.

In a preferred embodiment of the present invention the forward lookup structure 524, 526 is an element of the subsystem 518, 520.

In an alternative embodiment, the forward lookup structure 522, 514 is an element of the storage drive enclosure 516, the storage controller 512, or the host 505.

Turning to the subsystem method 200, the method starts at step 202.

At step 204, a pointer component 702 provides a verified pointer 606 in the structure 524 for LBA X 524 which points to the first mapped address 616. At the first mapped address 616, a first data version 620 is to be found. The first data version 620 comprises the last data that has been verified. Each LBA represents a unit of data. Such units of data are referred to in a number of ways, but for the purposes of illustration, will be referred to herewithin as a "grain" of data. Typical grain sizes are 16 kB, 32 kB, but the skilled person would understand that other sizes are possible. The term "extent" refers to a contiguous range of storage blocks or data blocks on a storage device, such as a hard disk drive (HDD) or an SSD. Extents are used to manage and allocate storage space efficiently within the storage system.

When a storage controller writes or reads a volume, the multiple constituent grains may be written or read from multiple subsystems concurrently.

At step 206 a read/write component 704 writes a second data version 622 for LBA X 524 at a second mapped address 618. The second mapped address 618 is different from the first mapped address 616, because the Flash memory stores data sequentially.

At step 208, the pointer component 702 provides a write head pointer 604 in the structure 524 for LBA X 524 which points to the second mapped address 622. The second mapped address 622 now contains the second data version 622. The second data version 622 at this stage has not been verified.

FIG. 6B provides an example after a further write to the Flash memory 506, 508. FIG. 6B depicts mapping 624 from write head pointer 604 to a further second mapped address 626. FIG. 6B depicts Flash memory 506 containing a first data version 620 at the first mapped address 616, and a further second data version 622B at the further second mapped address 626. For clarity, an 'S' suffix is used herewithin to indicate stale data. Second data version 622S is stale data, because second data version 622S has been superseded by the further data version 622B.

Having written a data volume 902, the system comprises a set of subsystems 518, 520. The subsystem 518, 520 comprises volume data 902 in the form of data grains G1:GN at mapped addresses corresponding to the logical block addresses for the volume. The forward lookup structure 524 comprises write head pointers 604 to the second mapped addresses. The forward lookup structure 524 also comprises verified pointers 606 to first mapped addresses. Reading data from the first mapped addresses result in a verified volume 902. Reading data from the second mapped addresses pointed at by the write head pointers 604 result in the latest written data volume 902. Flash memory 506, 508 also comprise stale data 622S.

Turning now to FIG. 3, the control method starts at step 302. At step 304 a detect component 706 detects an anomaly in a volume 902. In an alternative embodiment, detecting comprises a regular check of particular volumes 902.

At step 306, an analyse component 708 takes the volume 902 offline. This avoids ongoing reads or writes to the volume 902 that would complicate analysis.

At step 308 an identify component 710 identifies underlying subsystems 518, 520 that contain grains G1:GN of the volume 902. FIG. 8 depicts that grains G1:GN are stored on two Flash memory 518, 520. Flash memory 904 do not comprise grains from the volume 902.

At step 310, a first send/receive component 712 sends a command 714 to the identified Flash memory 518, 520 to trigger a metadata check. The command 714 comprises an operation code 716 for the metadata check and an LBA 718 for the respective grain G1:GN.

Returning to FIG. 2, at step 212 a second send/receive component 720 receives the command 714. At step 214 a gather component 722 gathers metadata for each identified LBA x1:xN. The metadata comprises real time statistics about the data stored at the mapped addresses pointed at by the write head pointer 604. Examples of statistics include read/write rates, compression rates and Shannon Entropy of data.

The second send/receive component 720 sends the gathered metadata to the control function.

Returning to FIG. 3, at step 312 the first send/receive component 712 receives the metadata gathered for each of the identified LBAs x1:xN. At step 314 a collate component 724 collates the gathered metadata to produce an entropy signature 726 representative of the volume 902 under analysis.

At step 316, the analyse component 708 performs a Shannon entropy analysis of the collated volume using the entropy signature 726. The result of the analysis is an indicator 728, which indicates whether the latest written volume 902 is unreliable with a non-verify indicator, or whether the latest written volume 902 can be verified as reliable with a verify indicator.

At step 318, the first send/receive component 712 sends the indicator to each of the identified LBAs x1:xN from step 308.

Returning to FIG. 2, at step 216, the second send/receive component 720 at each identified Flash memory 518, 520 receives the indicator 728. At step 218 a path component 730 reviews the indicator 728. Referring also to FIG. 6C, if the indicator 728 indicates that the latest written volume 902 is reliable (GOOD), at step 220, the pointer component 220 updates the verified pointer 606 to point at the further second mapped address 626 for each of the identified LBAs x1:xN. The write head pointer 604 and the verified pointer 606 both point to the same mapped address 626. FIG. 6C also depicts that the data 620S at the first mapped address 616, and the data 622S at the second mapped address 618 are both now stale.

FIG. 6D depicts a further cycle of steps 204-208. At step 206 the write/read component 704 writes a third data version 622C for LBA X 524 at another second mapped address 628.

At step 208, the pointer component 702 provides a write head pointer 604 in the structure 524 for LBA X 524 which points to the another second mapped address 628. The verified pointer 606 points to further second mapped address 626.

At step 232, a garbage collector component 732 carries out a garbage collection operation as is known in the art on stale grains 620S and 622S. The method ends at step 299.

Returning to step 218, the path component 730 reviews the indicator 728. If the indicator 728 indicates that the latest written volume 902 is unreliable (BAD) the method returns to step 320. In practice, as the indicator 728 indicates an unreliable volume 902, step 320 can be started immediately after step 318, or indeed instead of step 318.

At step 320, the read/write component 704 sends a read command 732 to the identified Flash memory 518, 520 to read the data. The command 732 comprises an operation code 734 for the read and an LBA 718 for the respective grain G1:GN.

Returning to FIG. 2, at step 222 the identified Flash memory 518, 520 receive the command 732 and read the data stored at the mapped addresses pointed at by the write head pointer 604, and the verified pointer 606. The identified Flash memory 518, 520 send the read data to the control function.

Returning to FIG. 3, at step 322, the read/write component 704 receives and collates the data into two volumes: a latest written volume 738 as provided by mapped addresses pointed at by the write head pointers 604; and latest verified volume 740 as provided by mapped addresses pointed at by the verified pointers 606.

At step 324, the compare component 736 compares the latest written volume 738 with the latest verified volume 740 to select which of the two volumes should be retained. The skilled person would understand that a number of techniques could be used to select the volume, for example, virus checking, and ransomware checking.

At step 326, the first send/receive component 712 sends a selection 728 to each of the identified Flash memory 518, 520.

Returning the step 226, the second send/receive components 720 receive the selection 728.

At step 228, the path component 730 analyses the selection 728. If the selection indicates that the latest written volume 738 is reliable, the method moves to step 220 as described above.

However, if the selection indicates that the latest written volume 738 is unreliable, the method moves to step 230. As the latest written volume 738 is unreliable the latest verified volume is to be retained. As depicted in FIG. 6E, which follows on from FIG. 6D, the pointer component 702 updates the write head pointer 604 to point back at the same mapped address as the verified pointer 606. FIG. 6E now depicts two grains of stale data 622S. In this way, the data is rolled back to the latest verified version.

FIG. 6F depicts a further cycle of steps 204-208. At step 206 the write/read component 704 writes a fourth data version 622D for LBA X 524 at another second mapped address 628.

At step 208, the pointer component 702 provides a write head pointer 604 in the structure 524 for LBA X 524 which points to the another second mapped address 628. The verified pointer 606 points to further second mapped address 630.

The method returns to step 232 for garbage collection as described above. At steps 299 and 399 the methods end.

In alternative embodiments of the present invention, Flash memory maintains a "change volume" within the Flash memory. Garbage collection is held off until the new write data is validated, so that new "bad data" can easily roll back to the copy of the known good verified data. The change volume acts as a buffer holding the latest version of the data on the device, while the "non change volume"/production data is the data on the drive.

In an alternative embodiment, checking is initiated by one of the Flash memory subsystems. Flash memory can be aware of the host volume 902 associated with the data and this allows the Flash memory to aggregate data validation (for example, entropy check or other technique) against a volume's data that can be subsequently offloaded for ransom-ware algorithms to investigate.

The host volume identification is provided by the system's virtualisation engine that allocates areas of back-end storage for the system's. The system will UNMAP a grain when no longer used allowing the Flash memory to discard the metadata and associated data allocation it holds. The other type of UNMAP that can occur is when new data are written over existing data, where the Flash memory will unmap the old data and use the new data.

The idea in this invention is to keep data that has a host volume association when unmapped, until the volume's new data have been ransom-ware checked or validated, at which point the data can be considered as unmapped and completely discarded. The value here is that the Flash memory already adds overwritten data into a pool for later "garbage collection" or discard. Adding an extra step means that there is a new pool of modified but not discarded data that keeps the host volume association until the more recent data are verified, at which point the old data can be safely discarded.

The drive maintains a write head pointer for new inbound writes and a verified pointer to the last good checkpoint data. Any ongoing active writes will overwrite the write head so only two pointers are needed to be maintained. Any overwritten write head data can be immediately discarded, the entropy is calculated on writes entering the write head. The external management software (e.g. Storage Insights) can compare the ongoing write head entropy to the last checkpointed entropy (which is equivalent to the last known good entropy).

The Flash memory itself already over-allocates capacity to allow for out of band garbage collection. The proposed delay of garbage collection should not therefore impact the overall storage offered by the Flash memory. Flash memory already has the ability to manage going out of space if compression is achieving a worse ratio that expected and this function of delaying the discard and garbage collection would behave in the same manner.

The method of checkpointing the data can be implemented by multiple ways. For example; a simple Quiesce/resume cycle of data managed by the storage controller can be used. In this way, all I/O is quiesced and flushed from the storage controller and then the check point command is sent to all Flash memory associated with this host volume. Then I/O is resumed. Alternatively this could be implemented with a checkpoint generation and any inbound write I/O could increment the checkpoint generation. The SSDs on receiving a new generation volume could store this value and lazily update the verified data pointers.

If a host volume is determined as being damaged in some way, the recovery method should be to go back to the most recent verified data of that volume 902 that is available in the Flash memory. The volume 902 can be taken offline for writes and presented as read only. The volume 902 can be presented to two modes, one the old verified data and two, the new write head data, as the Flash memory can be asked to present the old last verified data on read rather than the write head. If the host validates that the old data is good then the Flash memory can commit to roll back all data for this volume to the last verified data and discard the active write head that was corrupt. As this is managed per host volume it can result in only one volume's data rolling back and all other volume's data is unaffected. All Flash memory providing storage to the pool should be informed to do the action of rollback if validation of the data detects an issue with specific host volume(s). As the write head data is also presented it allows the volume 902 to be scanned for good data up to the point that corruption is detected and this can be recovered and rewritten to the volume 902 after it is rolled back to the verified data.

Dealing with drive failures within the array, there are a number of options available:

Inform other drives in the array to roll forward any uncommitted writes and assume the checkpoint is good and ignore any potential bad data.

Allow the drive to roll back, then inform the storage controller of the roll back, so the controller can rebuild parity within the RAID stride.

Checkpointing that data is good is managed at a stride level. So the parity of good valid data checkpoints the stride also. Therefore if there needs to be a roll back, there is no need to rebuild the parity in the stride. This would mean that the unit of allocation per volume would be a Raid stride.

In an alternative embodiment, a different interface is used, for example NVMe.

Although the present invention has been described using a forward lookup structure as a mapping between logical addresses and mapped addresses, the skilled person would understand that other forms of structure could be used, for example, a backward (also known as a reverse) lookup structure.

In an alternative embodiment, the mapped addresses can relate to a logical device, rather than a physical device. For example, the physical data layout on media 506 can be replaced by a logical device, for example a RAID array, a Copy Services logical disk, and/or in compressed form.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For the avoidance of doubt, the term "comprising", as used herein throughout the description and claims is not to be construed as meaning "consisting only of".

What is claimed is:

1. A method for managing data in a storage system, the storage system comprising: a set of subsystems, each subsystem comprising:

a structure comprising a set of mappings between logical addresses and mapped addresses; and a storage device comprising a first data version for the first logical address at a first mapped address; the method comprising:

for at least one substructure:
providing, in the structure, for the first logical address, a verified pointer to the first mapped address;
writing a second data version for the first logical address at a second mapped address, the second mapped address different from the first mapped address;
providing, in the structure, for the first logical address a write-head pointer to the second mapped address;
gathering the second data version to determine metadata for the second data version, the metadata associated with an indicator; and
in response to the indicator comprising a verify indicator, updating the verify pointer to the second mapped address.

2. The method of claim 1, further comprising, in response to the indicator comprising a non-verify indicator, reading the first data version and the second data version.

3. The method of claim 1, further comprising, in response to the indicator comprising a non-verify indicator, updating the write-head pointer to the first mapped address.

4. The method of claim 1, wherein the storage device comprises a set of further data versions at respective further addresses, the method further comprising, in response to the indicator comprising a verify indicator, adding the first data version at the first mapped address to the set of further data versions.

5. The method of claim 4 further comprising, in response to the indicator comprising a non-verify indicator, adding the second data version at the second mapped address to the set of further data versions.

6. The method of claim 4 further comprising garbage collecting the set of further data versions by deleting the set of further data versions.

7. The method of claim 1, wherein the mapped address comprises a physical address of the storage device.

8. The method of claim 1, wherein the storage device is one of a list, the list comprising: a storage controller; Flash memory; a disk drive; and other writable storage devices that allow for logical to physical mappings.

9. The method of claim 1, wherein the structure is a log structured array.

10. The method of claim 1, wherein the storage device is operable for storing data sequentially.

11. The method of claim 1, further comprising:
identifying a set of first logical addresses identified with a storage volume;
for each subsystem associated with the storage volume;
analysing the second data version to determine a collated metadata set;
analysing the collated metadata set to determine the indicator for the storage volume; and
providing the indicator to each of the subsystems associated with the storage volume.

12. The method of claim 11, wherein analysing the collated metadata set comprises performing a Shannon entropy analysis.

13. The method of claim 11, wherein in response to the indicator comprising a non-verify indicator, for each subsystem associated with the storage volume reading the first data version and the second data version;
collating each of the first data versions into a first volume version;
collating each of the second data versions to a second volume version; and
comparing the first volume version with the second volume version to select a chosen volume version.

14. The method of claim 13, wherein in response to the chosen volume version being the first volume version, for each of the storage devices associated with the storage volume, updating the write-head pointer to the first mapped address.

15. The method of claim 13, wherein in response to the chosen volume version being the second volume version, for each of the storage devices associated with the storage volume, updating the verify pointer to the second mapped address.

16. A system for managing data in a storage system, the storage system comprising: a set of subsystems, each subsystem comprising:
a structure comprising a set of mappings between logical addresses and mapped addresses; and a storage device comprising a first data version for the first logical address at a first mapped address; the system comprising:
for at least one substructure:
providing, in the structure, for the first logical address, a verified pointer to the first mapped address;
writing a second data version for the first logical address at a second mapped address, the second mapped address different from the first mapped address;
providing, in the structure, for the first logical address a write-head pointer to the second mapped address;
gathering the second data version to determine metadata for the second data version, the metadata associated with an indicator; and
responsive to the indicator comprising a verify indicator; updating the verify pointer to the second mapped address.

17. The system of claim 16, further comprising, responsive to the indicator comprising a non-verify indicator, reading the first data version and the second data version.

18. The system of claim 16, further comprising, responsive to the indicator comprising a non-verify indicator, updating the write-head pointer to the first mapped address.

19. The system of claim 16, wherein the storage device comprises
a set of further data versions at respective further addresses, the system further comprising, responsive to the indicator comprising a verify indicator, adding the first data version at the first mapped address to the set of further data versions.

20. The system of claim 19 further comprising, responsive to the indicator comprising a non-verify indicator, adding the second data version at the second mapped address to the set of further data versions.

21. The system of claim 19 further comprising garbage collecting the set of further data versions by deleting the set of further data versions.

22. The system of claim 16, further comprising:
identifying a set of first logical addresses identified with a storage volume;
for each subsystem associated with the storage volume:
analysing the second data version to determine a collated metadata set; and
analysing the collated metadata set to determine the indicator for the storage volume; and
providing the indicator to each of the subsystems associated with the storage volume.

23. The system of claim 22, wherein analysing the collated metadata set comprises performing a Shannon entropy analysis.

24. A computer program product for managing a storage system,
- the storage system comprising: a set of subsystems, each subsystem comprising,
- a structure comprising a set of mappings between logical addresses and mapped addresses; and a computer readable storage medium comprising a first data version for the first logical address at a first mapped address; the computer program product comprising:
- for at least one substructure:
- providing, in the structure, for the first logical address, a verified pointer to the first mapped address;
- writing a second data version for the first logical address at a second mapped address, the second mapped address different from the first mapped address;
- providing, in the structure, for the first logical address a write-head pointer to the second mapped address;
- gathering the second data version to determine metadata for the second data version, the metadata associated with an indicator; and
- in response to the indicator comprising a verify indicator, updating the verify pointer to the second mapped address.

* * * * *